(No Model.)
W. FORSHEE.
SAP BUCKET.
No. 366,210. Patented July 12, 1887.
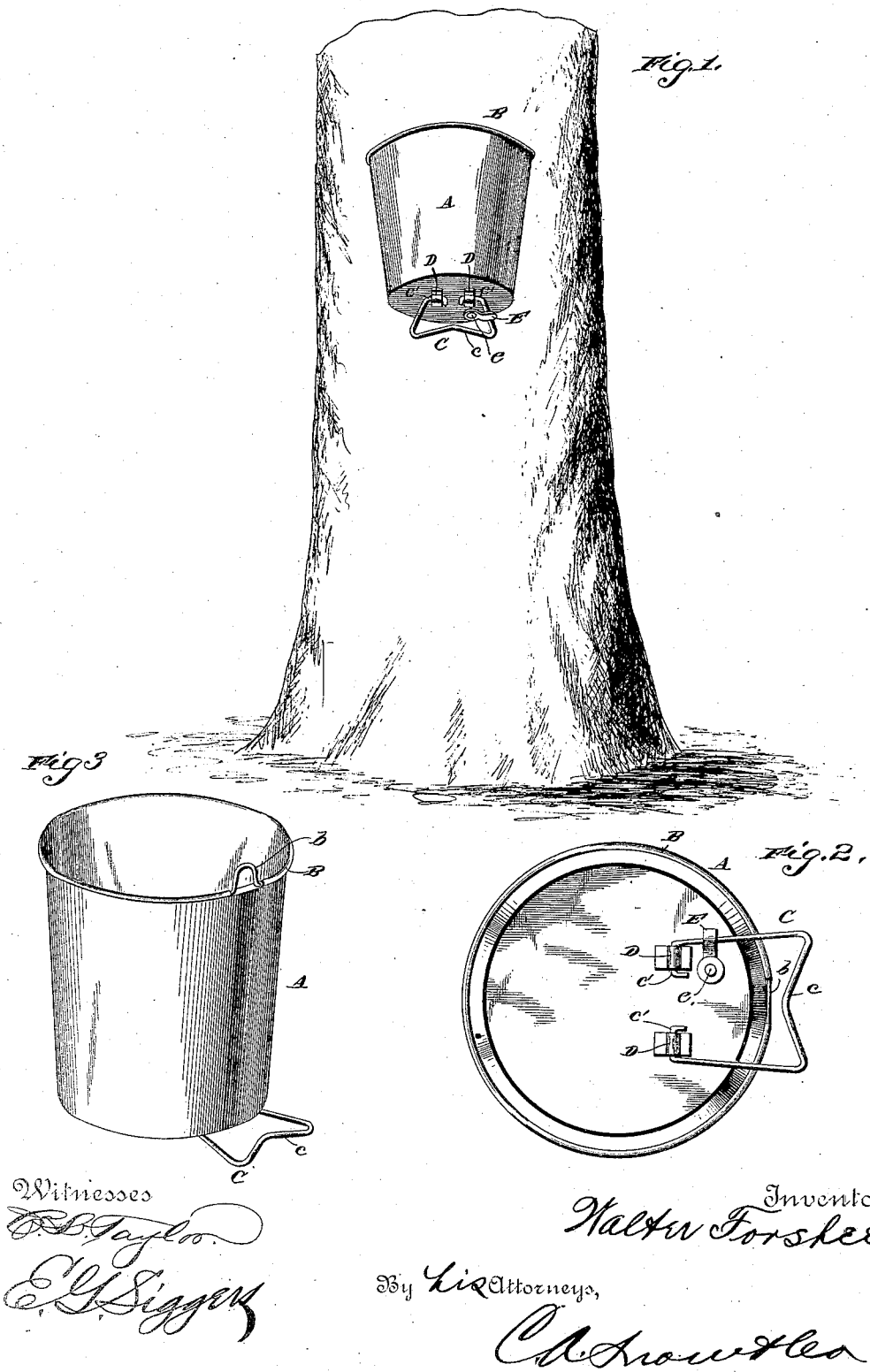

UNITED STATES PATENT OFFICE.

WALTER FORSHEE, OF WILLETT, NEW YORK.

SAP-BUCKET.

SPECIFICATION forming part of Letters Patent No. 366,210, dated July 12, 1887.

Application filed March 9, 1887. Serial No. 230,283. (No model.)

*To all whom it may concern:*

Be it known that I, WALTER FORSHEE, a citizen of the United States, residing at Willett, in the county of Cortland and State of New York, have invented a new and useful Improvement in Sap-Buckets, of which the following is a specification.

The invention relates to improvements in buckets for catching the sap running from incisions made in maple-sugar trees; and its object is to provide simple and efficient means whereby the buckets may be held vertically and filled to the brim with sap before the same runs over, thus economizing in time and labor in collecting the sap for boiling.

A further object of the invention is to construct the said means or devices in such manner that the same will serve as supports or handles for the easy carriage of the buckets from the trees to the kettles or storage-receptacles.

The invention consists, essentially, in the construction and arrangement of a frame attached to the bottom of the bucket and adapted to be turned outward, so that when the upper edge of the bucket is secured to the tree the frame will impinge against the same and hold the bucket erect.

The invention further consists in certain details of construction and arrangement hereinafter described, and embraced in the claims hereto appended.

In the accompanying drawings, Figure 1 represents a perspective view of the improved sap-bucket attached to a tree. Fig. 2 represents a reversed plan of the bucket, showing the attachment of the frame to the bottom thereof. Fig. 3 is a perspective view of the bucket.

The device is particularly adapted for attachment to conical buckets, but with a little modification can be applied to buckets with straight sides.

Referring to the drawings, A designates a bucket, of wood, metal, or other suitable material, and having the shape of an inverted frustum of a cone.

B is a bead formed around the upper edge of the bucket by bending the said edge over a ring of wire, the edge being cut away at one point and the wire at that point bent upward to form the loop $b$, through which a sap-spout, a nail, or a screw may be driven into a tree to suspend the bucket therefrom below the proper incision.

C is a frame, made of stiff wire bent upon itself at the proper angles, and having its outer transverse bar, $c$, bent concave, so that it will rest against the surface of the trunk of a tree without swinging laterally thereon. The ends $c'$ of the frame are bent inward and journaled in bearings D, secured to the bottom of the bucket, by solder, preferably, if the bucket is of metal, and by screws, preferably, if the bucket is of wood. The ends of the journals inside of the bearings are turned outward to prevent the former from being sprung out of the latter.

E is a detent or keeper, pivoted at $e$ to the outer side of one of the journals D, on the bottom of the bucket. The said detent, when the frame C is turned out, can have its point turned below the adjacent side bar of the frame, so as to lock the latter in position by binding it against the bottom of the bucket to hold the axis of the latter vertically, when the loop or hanger is secured, as described, to a tree. The concave form of the transverse bar $c$ of the frame causes it to hug the trunk of the tree, and be much less liable to be displaced or caused to vibrate by the wind or jar than if the said bar were straight. The frame, when locked outward, as described, and the loop offer convenient points or handles by which to carry the bucket from the tree to the kettles or storage-receptacles. In transporting the buckets from place to place the frames are folded under the bottoms to be out of the way.

I wish it understood that I am not limited to the detent as a means for holding the support in its upturned position, as many other equivalent means would suggest themselves to a skillful mechanic.

Having described my invention, I claim—

1. A sap-bucket having a support pivoted on the under side of its bottom, the outer edge of the support being concave, so as to conform to the tree-trunk when turned up against the same, and means for holding the support in its upturned position, substantially as set forth.

2. A sap-bucket having a support journaled on the under side of its bottom, and a detent pivoted on the bottom and adapted to hold the support in its upturned position, substantially as set forth.

3. The combination of the conical bucket A, the loop of wire $b$ on the upper edge thereof, the wire frame C, having its ends $c'$ journaled in the bearings D, secured to the bottom of the bucket, and its outer transverse bar, $c$, made concave outward, and the detent E, pivoted to the bottom of the bucket in such position that its point may be turned over the adjacent side bar of the frame C to lock it in position outward, substantially as specified.

In testimony that I claim the foregoing as my own I have hereto affixed my signature in presence of two witnesses.

WALTER FORSHEE.

Witnesses:
WILLIAM J. McMINN,
WILLIAM M. KELLEHER.